(12) United States Patent
Nakagawa

(10) Patent No.: US 10,250,687 B2
(45) Date of Patent: Apr. 2, 2019

(54) VEHICLE REMOTE OPERATION INFORMATION PROVISION DEVICE, VEHICLE-MOUNTED REMOTE OPERATION INFORMATION ACQUISITION DEVICE, AND VEHICLE REMOTE OPERATION SYSTEM COMPRISING THESE DEVICES

(75) Inventor: Masashi Nakagawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 686 days.

(21) Appl. No.: 14/370,799

(22) PCT Filed: Jan. 25, 2012

(86) PCT No.: PCT/JP2012/051528
§ 371 (c)(1),
(2), (4) Date: Oct. 15, 2014

(87) PCT Pub. No.: WO2013/111282
PCT Pub. Date: Aug. 1, 2013

(65) Prior Publication Data
US 2015/0163306 A1    Jun. 11, 2015

(51) Int. Cl.
*G06F 15/173*     (2006.01)
*H04L 29/08*      (2006.01)
(Continued)

(52) U.S. Cl.
CPC .......... *H04L 67/12* (2013.01); *B60R 25/2018* (2013.01); *B60R 25/24* (2013.01);
(Continued)

(58) Field of Classification Search
CPC ..... H04L 67/12; H04L 67/32; H04L 63/1441; H04L 63/10; H04W 4/046; B60R 25/2018;
(Continued)

(56) References Cited

U.S. PATENT DOCUMENTS 7,039,708 B1    5/2006  Knobl et al.
8,812,654 B2 *  8/2014  Gelvin .................... H04L 67/12
                                               709/224

(Continued)

FOREIGN PATENT DOCUMENTS

JP    08-149608 A       6/1996
JP    2003-041821 A     2/2003
(Continued)

*Primary Examiner* — Thu Ha T Nguyen
(74) *Attorney, Agent, or Firm* — Oblon, McClelland, Maier & Neustadt, L.L.P.

(57) ABSTRACT

In a vehicle remote operation system, when acquiring remote operation request information from a user of a vehicle 100, a server 210 in a command administration center 200 transmits access request information, requesting an access to the center 200 as a predetermined connection destination, to a command acquisition ECU 110a mounted on the vehicle 100. When acquiring the access request information transmitted from the center 200, the ECU 110a accesses to the center 200 as the predetermined connection destination connected to a network 400. Thus, the command information server 212 in the center 200 provides command information, corresponding to a remote operation command corresponding to a remote operation requested by the user of the vehicle 100, to the ECU 110a via the network 400. The ECU 110a then supplies the command information to the corresponding vehicle ECU 110 for allowing the vehicle 100 to operate as requested by the user.

20 Claims, 7 Drawing Sheets

(51) Int. Cl.
  *B60R 25/24* (2013.01)
  *B60R 25/20* (2013.01)
  *H04L 29/06* (2006.01)
  *H04W 4/04* (2009.01)

(52) U.S. Cl.
  CPC .......... *H04L 63/10* (2013.01); *H04L 63/1441* (2013.01); *H04L 67/32* (2013.01); *H04W 4/046* (2013.01); *B60R 2325/101* (2013.01); *B60R 2325/205* (2013.01)

(58) Field of Classification Search
  CPC .............. B60R 25/24; B60R 2325/101; B60R 2325/205
  USPC .................................................. 709/225, 226
  See application file for complete search history.

(56) References Cited

U.S. PATENT DOCUMENTS

| | | | |
|---|---|---|---|
| 9,649,999 B1* | 5/2017 | Amireddy | B60R 16/023 |
| 9,963,106 B1* | 5/2018 | Ricci | B60R 25/2018 |
| 2003/0098781 A1* | 5/2003 | Baset | B60R 25/2009 340/5.72 |
| 2004/0178891 A1* | 9/2004 | Palmer | B60R 25/1003 340/426.1 |
| 2005/0050214 A1 | 3/2005 | Nishiyama et al. | |
| 2005/0071079 A1* | 3/2005 | Godfrey | G01C 21/26 701/485 |
| 2006/0071763 A1* | 4/2006 | Ramos | B60R 25/042 340/426.12 |
| 2007/0021100 A1* | 1/2007 | Haave | B60R 25/102 455/404.2 |
| 2008/0172147 A1* | 7/2008 | Taki | B60R 25/2018 701/2 |
| 2009/0177336 A1* | 7/2009 | McClellan | B60R 25/2018 701/2 |
| 2012/0036552 A1* | 2/2012 | Dare | H04L 41/0253 726/1 |
| 2013/0090173 A1* | 4/2013 | Kislyi | A63F 13/12 463/43 |
| 2013/0205026 A1* | 8/2013 | Ricci | H04L 47/70 709/225 |
| 2014/0122702 A1* | 5/2014 | Jung | H04L 43/0876 709/224 |
| 2014/0152836 A1* | 6/2014 | Morris | G08B 13/19608 348/159 |
| 2014/0266582 A1* | 9/2014 | Lopez | B60R 25/00 340/5.25 |
| 2015/0054647 A1* | 2/2015 | Edwards | G08B 21/22 340/568.1 |
| 2015/0319558 A1* | 11/2015 | Smereka | H04W 4/046 455/41.2 |
| 2016/0012653 A1* | 1/2016 | Soroko | G07C 9/00007 340/5.61 |
| 2016/0098870 A1* | 4/2016 | Bergerhoff | G07C 9/00007 340/5.61 |
| 2016/0099927 A1* | 4/2016 | Oz | H04L 63/08 726/9 |
| 2017/0093643 A1* | 3/2017 | Ricci | H04L 41/14 |
| 2017/0178035 A1* | 6/2017 | Grimm | H04L 63/061 |
| 2017/0221352 A1* | 8/2017 | Geerlings | G08C 17/02 |
| 2017/0228945 A1* | 8/2017 | Lee | G07C 5/008 |
| 2017/0235848 A1* | 8/2017 | Van Dusen | H04L 41/04 705/12 |
| 2017/0236344 A1* | 8/2017 | Murar | G07C 9/00007 340/5.61 |
| 2017/0282859 A1* | 10/2017 | Grimm | H04L 9/0891 |
| 2017/0324817 A1* | 11/2017 | Oliveira | H04L 67/142 |
| 2017/0337068 A1* | 11/2017 | Maria | H04L 67/18 |
| 2018/0126951 A1* | 5/2018 | Ricci | B60R 25/2018 |
| 2018/0194323 A1* | 7/2018 | Woodill, Jr. | G07C 9/00 |
| 2018/0239349 A1* | 8/2018 | Rasmussen | G05D 1/0011 |

FOREIGN PATENT DOCUMENTS

| | | |
|---|---|---|
| JP | 2004-068421 A | 3/2004 |
| JP | 2006-193919 A | 7/2006 |
| JP | 2007-49469 A | 2/2007 |
| JP | 2010-143581 A | 7/2010 |
| JP | 2010-242446 A | 10/2010 |
| WO | WO 2006/075533 A1 | 7/2006 |

\* cited by examiner

VEHICLE REMOTE OPERATION INFORMATION PROVISION DEVICE, VEHICLE-MOUNTED REMOTE OPERATION INFORMATION ACQUISITION DEVICE, AND VEHICLE REMOTE OPERATION SYSTEM COMPRISING THESE DEVICES

TECHNICAL FIELD

The present invention relates to a vehicle remote operation information provision device that provides various information pieces including command information indicating a remote operation command for remotely operating a vehicle, a vehicle-mounted remote operation information acquisition device that is mounted on the vehicle and that acquires various information pieces including the remote operation command from an outside, and a vehicle remote operation system comprising these devices.

BACKGROUND ART

Recently, devices and systems of this type has been actively studied and proposed. For example, the patent document 1 described below describes a vehicle remote operation device that can use a power-saving mode and a simple-operation mode as a control system, according to need. In this conventional vehicle remote operation device, unit control means provided to a vehicle-mounted communication device that receives a wireless signal from a mobile communication device controls a door lock unit based on the wireless signal from the mobile communication device. The unit control means is configured to execute a switch operation control system for controlling the door lock unit based on the wireless signal transmitted from the mobile communication device by a switching operation of the mobile communication device and a switch non-operation control system for controlling the door lock unit based on the wireless signal transmitted from the mobile communication device according to a call signal continuously or intermittently transmitted from the vehicle-mounted communication device. In this conventional vehicle remote operation device, the control system can be switched between these control systems.

The patent document 2 described below describes a phone control system for an electric vehicle, the system being capable of managing a charging state and an air-conditioning state, even if the system is located at a place far apart from the vehicle. In the conventional phone control system for an electric vehicle, a phone controller forming an automobile telephone deciphers a code input made by a sound or tone signal from a mobile phone from a driver, and a charging controller and an air-conditioner controller start or stop an operation of an air-conditioner immediately or after a lapse of a predetermined time, in cooperation with each other based on the control of the phone controller.

The patent document 3 described below describes a vehicle including a remote control system and a remote operation device that can realize a remote operation of a vehicle-mounted device by arbitrating plural operation requests issued for this vehicle-mounted device. In this conventional vehicle including the remote control system and the remote operation device, a remote operation of the vehicle-mounted device is requested to the vehicle via a center from an operation terminal by the user of the vehicle according to the operation of the operation terminal by the user of the vehicle, whereby the remote operation of the vehicle-mounted device is executed. The system allows the vehicle to transmit local operation information and remote operation result information to the center, and when the center receives the request of the remote operation for the vehicle-mounted device from the operation terminal, the system allows the center to determine whether or not the remote operation for the vehicle-mounted device has to be requested to the vehicle based on the local operation information and the remote operation result information from the vehicle.

The patent document 4 described below describes a remote unlocking method, remote unlocking system, information processing device, and information processing program that can unlock an open/close section, provided to a vehicle, by a third person with security being assured and without deteriorating usability of an owner of the vehicle, in the case where the open/close section is unlocked by a remote control. In the conventional remote unlocking method, remote unlocking system, information processing device, and information processing program described above, when a request of unlocking the open/close section of the vehicle is transmitted to an information center from a terminal of the third person, the information center transmits an unlocking code for unlocking the open/close section to a vehicle-mounted device of the vehicle, under the condition in which a terminal of the owner transmits an unlocking permission of the open/close section of the vehicle to the information center, and the information center receives the unlocking permission.

PRIOR ART DOCUMENT

Patent Document

Patent Document 1: Japanese Patent Application Laid-Open (kokai) No. 2004-68421
Patent Document 2: Japanese Patent Application Laid-Open (kokai) No. 08(1996)-149608
Patent Document 3: Japanese Patent Application Laid-Open (kokai) No. 2006-193919
Patent Document 4: Japanese Patent Application Laid-Open (kokai) No. 2003-41821

SUMMARY OF THE INVENTION

In the conventional devices and systems described above, the vehicle might be remotely operated according to the transmitted remote operation command, even when a malicious third person pretends to be an authorized owner (user) of the vehicle and transmits the remote operation command (instruction) to the vehicle, or even when the remote operation command is transmitted to the vehicle from a fake center. According to this, an undesirable situation that is not intended by the authorized owner (user) of the vehicle might occur on the vehicle.

The present invention has been accomplished in order to solve the above-described problems, and one of its objects is to provide a vehicle remote operation information provision device, and a vehicle-mounted remote operation information acquisition device, which surely realize a remote operation requested by an authorized user of a vehicle, and to provide a vehicle remote operation system comprising these devices.

In order to achieve the above-described object, the present invention provides a vehicle remote operation information provision device that provides various information pieces relating to a remote operation for a vehicle requested by a user of the vehicle, and that includes remote operation request information acquisition means, access request information transmission means, and remote operation command provision means.

Specifically, the remote operation request information acquisition means acquires remote operation request information indicating a request of a remote operation for the vehicle by the user of the vehicle. The access request information transmission means transmits access request information, which requests an access to a predetermined connection destination, to the vehicle based on the remote operation request information acquired by the remote operation request information acquisition means. The remote operation command provision means is provided to the connection destination accessed by the vehicle based on the access request information transmitted from the access request information transmission means, and provides command information indicating a remote operation command for realizing the remote operation requested by the user of the vehicle according to the access from the vehicle.

In this case, the vehicle remote operation information provision device according to the present invention can include communication means that realizes indirect communication with the vehicle through a predetermined network, or direct communication with the vehicle, wherein the access request information transmission means can transmit the access request information to the vehicle by using the communication means, and the remote operation command provision means provided to the connection destination can transmit the command information to the vehicle by using the communication means. More specifically, the access request information transmission means can transmit the access request information to the vehicle by using, for example, the indirect communication by the communication means, and the remote operation command provision means provided to the connection destination can transmit the command information to the vehicle by using, for example, the direct communication by the communication means.

In these cases, the connection destination to which the remote operation command provision means is provided can be, for example, a command administration center that is connected to a predetermined network to which the vehicle is connected, and that provides the command information by communication through the predetermined network, or an information terminal that is carried by the user of the vehicle, and that provides the command information by either one of the indirect communication with the vehicle through the predetermined network and the direct communication with the vehicle. In this case, the connection destination to which the remote operation command provision means is provided can include not only the command administration center and the information terminal but also a LAN constructed at home, a server provided on this LAN, a company network constructed in a company, and a server provided on this network.

In these cases, the remote operation command provision means can provide the command information after encrypting the command information with an encryption process.

In order to achieve the above-described object, the present invention provides a vehicle-mounted remote operation information acquisition device that is mounted on a vehicle for acquiring various information pieces, relating to a remote operation for the vehicle requested by a user of the vehicle, from an outside, and that includes access request information acquisition means and remote operation command acquisition means.

Specifically, the access request information acquisition means acquires access request information that is transmitted from the outside for requesting an access to a predetermined connection destination. The remote operation command acquisition means accesses to the connection destination based on the access request information acquired by the access request information acquisition means for acquiring command information, indicating a remote operation command for realizing the remote operation requested by the user of the vehicle, from the connection destination.

In this case, the vehicle-mounted remote operation information acquisition device according to the present invention can also include communication means that realizes indirect communication with the outside through a predetermined network, or direct communication with the outside, wherein the access request information acquisition means can acquire the access request information from the outside by using the communication means, and the remote operation command acquisition means can acquire the command information from the connection destination by using the communication means. More specifically, the access request information acquisition means can acquire the access request information from the outside by using, for example, the indirect communication by the communication means, and the remote operation command acquisition means can acquire the command information from the connection destination by using, for example, the direct communication by the communication means.

In these cases, the predetermined connection destination can be a command administration center that is connected to a predetermined network to which the vehicle is connected, and that provides the command information by communication through the predetermined network, or an information terminal that is carried by a user of the vehicle, and that provides the command information by either one of the communication through the predetermined network and the direct communication with the vehicle.

In these cases, the remote operation command acquisition means can acquire the command information by decrypting the command information, which is encrypted at the connection destination, with a decryption process.

In order to achieve the above-described object, the present invention provides a vehicle remote operation system including the vehicle remote operation information provision device and the vehicle-mounted remote operation information acquisition device.

Specifically, in the vehicle remote operation system according to the present invention, the vehicle remote operation information provision device can include remote operation request information acquisition means configured to acquire remote operation request information indicating a request of a remote operation for the vehicle by the user of the vehicle; access request information transmission means configured to transmit access request information, which requests an access to a predetermined connection destination, to the vehicle-mounted remote operation information acquisition device based on the remote operation request information acquired by the remote operation request information acquisition means; and remote operation command provision means that is provided to the connection destination accessed by the vehicle-mounted remote operation information acquisition device based on the access request information transmitted from the access request information transmission means, and that provides command information indicating a remote operation command for realizing the remote operation requested by the user of the vehicle according to the access from the vehicle-mounted remote operation information acquisition device. In the vehicle remote operation system according to the present invention, the vehicle-mounted remote operation information acquisition device can include access request information acquisition means configured to acquire the access request information that is transmitted from the access request information transmission means in the vehicle remote operation information provision device; and remote operation command acquisition means configured to access to the connection destination based on the access request information acquired by the access request information acquisition means for acquiring the command information from the remote operation command provision means in the vehicle remote operation information provision device.

Accordingly, in this vehicle remote operation system, the vehicle remote operation information provision device and the vehicle-mounted remote operation information acquisition device can include communication means that realizes indirect communication with each other through a predetermined network, or direct communication with each other. The access request information transmission means in the vehicle remote operation information provision device and the access request information acquisition means in the vehicle-mounted remote operation information acquisition device can transmit and receive the access request information by using the communication means, and the remote operation command provision means in the vehicle remote operation information provision device and the remote operation command acquisition means in the vehicle-mounted remote operation information acquisition device can transmit and receive the command information by using the communication means. Specifically, in this vehicle remote operation system, the access request information transmission means in the vehicle remote operation information provision device and the access request information acquisition means in the vehicle-mounted remote operation information acquisition device can transmit and receive the access request information by using the indirect communication by the communication means, and the remote operation command provision means in the vehicle remote operation information provision device and the remote operation command acquisition means in the vehicle-mounted remote operation information acquisition device can transmit and receive the command information by using the direct communication by the communication means.

In the vehicle remote operation system described above, the predetermined connection destination can be, for example, a command administration center that is connected to a predetermined network to which at least the vehicle-mounted remote operation information acquisition device is connected, and that provides the command information by communication through the predetermined network, or an information terminal that is carried by a user of the vehicle, and that provides the command information by either one of the communication through the predetermined network and the direct communication with the vehicle-mounted remote operation information acquisition device.

In the vehicle remote operation system described above, the remote operation command provision means in the vehicle remote operation information provision device can provide the command information after encrypting the command information with an encryption process, and the remote operation command acquisition means in the vehicle-mounted remote operation information acquisition device can acquire the command information by decrypting the command information, which is encrypted by the remote operation command provision means in the vehicle remote operation information provision device, with a decryption process.

In the vehicle remote operation system described above, the vehicle remote operation information provision device can include, for example, authentication means configured to authenticate a vehicle, to which the vehicle-mounted remote operation information acquisition device is mounted, with an access to the connection destination by the remote operation command acquisition means, and the vehicle-mounted remote operation information acquisition device can include, for example, authentication means configured to authenticate the vehicle remote operation information provision device with the transmission of the access request information from the access request information transmission means.

According to the configuration described above, when an authorized user requests a remote operation for a vehicle, or when the authorized user actually operates the vehicle with a remote operation, the vehicle remote operation information provision device can request that the vehicle to which the vehicle-mounted remote operation information acquisition device is mounted accesses to a predetermined connection destination. When the vehicle accesses to the predetermined connection destination according to this access request, the vehicle-mounted remote operation information acquisition device can acquire command information for realizing the remote operation requested by the authorized user.

The access request information acquisition means in the vehicle-mounted remote operation information acquisition device can acquire access request information that includes a connection destination, or acquire access request information that does not include the connection destination, from the access request information transmission means in the vehicle remote operation information provision device. In this case, when the access request information includes the connection destination, the remote operation command acquisition means can access to this connection destination, and when the access request information does not include the connection destination, the remote operation command acquisition means can access to the connection destination predetermined to the vehicle. When the access request information includes the connection destination, and the remote operation command acquisition means accesses to this connection destination, the authentication means in the vehicle-mounted remote operation information acquisition device and the authentication means in the vehicle remote operation information provision device can mutually authenticate with each other.

According to this configuration, the vehicle-mounted remote operation information acquisition device cannot acquire the command information (remote operation command), unless it accesses to the connection destination predetermined to the vehicle remote operation information provision device. Consequently, the vehicle cannot execute a remote operation command other than the command information (remote operation command) acquired from this connection destination. Accordingly, only the command information (remote operation command) provided from the predetermined connection destination is executed on the vehicle. With this configuration, even if a malicious third person other than the user pretends to be the user to unilaterally provide the command information (remote operation command), the improper command information (remote operation command) is not acquired by the vehicle-mounted remote operation information acquisition device. Accordingly, this configuration can surely prevent the vehicle from being operated by a remote operation intended by a third person (i.e., not intended by the authorized user).

BEST MODE FOR CARRYING OUT THE INVENTION a. First Embodiment

Figure 1:
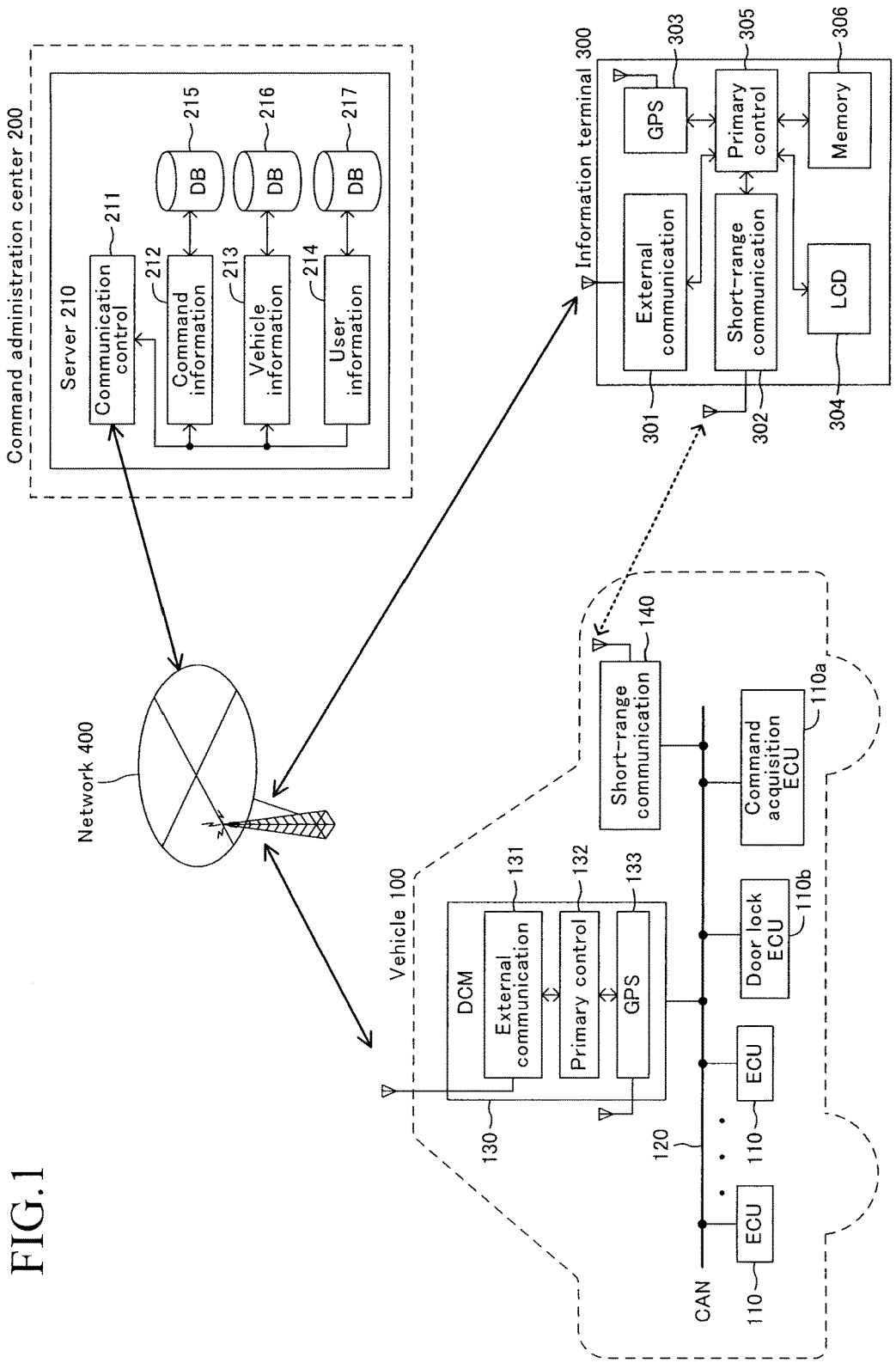
FIG. 1 is a schematic diagram illustrating a vehicle remote operation system including a vehicle remote operation information provision device and a vehicle-mounted remote operation information acquisition device according to embodiments of the present invention.

Hereinafter, a vehicle remote operation system according to embodiments of the present invention will be described with reference to the drawings. FIG. 1 is a schematic block diagram schematically illustrating a vehicle remote operation system including a vehicle remote operation information provision device and a vehicle-mounted remote operation information acquisition device according to the present invention.

The vehicle remote operation system according to the first embodiment includes a vehicle 100 that is to be remotely operated, a command administration center 200 serving as a vehicle remote operation information provision device that provides various information pieces, which include a remote operation command indicating the detail of the remote operation, to the vehicle 100, and an information terminal 300 carried by a driver or a fellow passenger (hereinafter collectively referred to as a user) of the vehicle 100. The vehicle 100, the command administration center 200, and the information terminal 300 are organically connected via a network 400 (e.g., the secure Internet, a dedicated network, etc.) such that the user can remotely operate the vehicle 100.

As illustrated in FIG. 1, the vehicle 100 is provided with a plurality of electronic control units 110 (hereinafter referred to as vehicle ECUs 110) for controlling the state of the vehicle. The vehicle ECUs 110 are connected to a CAN communication line 120 of a CAN (Controller Area Network) communication system such that they can input and output various signals with one another through the CAN communication line 120. Each vehicle ECU 110 is mainly composed of a microcomputer including a CPU, a ROM, a RAM, etc. Each vehicle ECU 110 has a nonvolatile memory, an input/output interface, a drive circuit for driving various actuators using signals received from sensors, and others.

As one of the vehicle ECUs 110 connected to the CAN communication line 120, a command acquisition ECU 110a is provided as access request information acquisition means, remote operation command acquisition means, and authentication means, which form a vehicle-mounted remote operation information acquisition device that accesses to the command administration center 200 at the outside to acquire a remote operation command, and changes the state of the vehicle to the state according to this command, as described later. The nonvolatile memory in the command acquisition ECU 110a stores address information, such as an IP address of a predetermined (pre-specified) connection destination (the command administration center 200 in the first embodiment) accessed by the vehicle 100, as described later. In the first embodiment, a door lock control ECU 110b is also provided as the vehicle ECU 110 for controlling the state of the vehicle. The door lock control ECU 110b controls a door lock device provided to a door, not illustrated, of the vehicle 100 to be locked or unlocked.

In addition, a data communication module 130 (hereinafter referred to as a DCM 130) for communication with the command administration center 200 via the network 400 is connected to the CAN communication line 120. The DCM 130 serves as communication means forming the vehicle-mounted remote operation information acquisition device. The DCM 130 includes an external communication control section 131 which indirectly sends and receives data to/from a later-described server 210 of the command administration center 200 via the network 400; a primary control section 132 which sends various information pieces from the command administration center 200 to the command acquisition ECU 110a and receives various information pieces from the command acquisition ECU 110a, via the CAN communication line 120; and a GPS unit 133 which detects the coordinates of the current position of the vehicle 100 on the basis of the radio waves from GPS satellites. With this configuration, the DCM 130 accesses (logs in) to the command administration center 200 via the network 400 by utilizing a mobile phone base station around the current position of the vehicle 100, thereby being capable of making communication with the server 210 in the command administration center 200.

A short-range communication control device 140 serving as communication means forming the vehicle-mounted remote operation information acquisition device is connected to the CAN communication line 120 for realizing short-range communication with the information terminal 300. The short-range communication control device 140 is provided to directly communicate with the information terminal 300. In the first embodiment, Bluetooth (registered trademark) is applied as the communication system. However, it is obvious that any other short-range wireless communication system such as Wi-Fi (registered trademark) can be applied as other communication systems.

An electric vehicle (EV) which includes a traction motor driven by electric power of a mounted battery, a hybrid vehicle (HV) that includes a traction motor and an internal combustion engine and that can charge a mounted battery, or a plug-in hybrid vehicle (PHV) that can be charged by a charger provided at the outside can be employed as the vehicle 100 applied to the vehicle remote operation system. However, the vehicle 100 may be a conventional vehicle which does not have a traction motor and which travels through use of power of the internal combustion engine. The vehicle 100 may be of any drive type.

The command administration center 200 is a facility that supplies (sends) access request information, which requests an access to the command administration center 200 that is a predetermined connection destination, and command information indicating a remote operation command for remotely operating the vehicle 100, to the vehicle 100 according to a request for the remote operation from the user of the vehicle 100. For this, the command administration center 200 includes the server 210 having a computer as a main component, as illustrated in FIG. 1. The server 210 includes a communication control section 211 serving as communication means that controls indirect communication with the vehicle 100 via the network 400, a command information server 212 that forms remote operation request information acquisition means, access request information transmission means, and remote operation command provision means, a vehicle information server 213 that forms authentication means, and a user information server 214.

The command information server 212 acquires command information, corresponding to the user's request for the remote operation, by utilizing a command information database 215 storing command information pieces such that they can be searched, and outputs the acquired command information to the communication control section 211. The vehicle information server 213 authenticates the vehicle 100 used by the user by utilizing a vehicle ID information database 216. The vehicle ID information database 216 stores vehicle ID information pieces (e.g., information corresponding to the registration number or chassis number of the vehicle, or a MAC address or phone number assigned to the DCM 130) for specifying the vehicle 100 in such a manner that these information pieces can be searched. The user information server 214 authenticates the user using the vehicle 100 by utilizing a user ID information database 217. The user ID information database 217 stores user ID information pieces for identifying the user (information corresponding to the user name, the phone number or MAC address of the information terminal 300, the mail address, etc.) in such a manner that these information pieces can be searched. The vehicle ID information and the user ID information are stored in the vehicle ID information database 216 or the user ID information database 217 so as to be associated with each other, whereby one of the vehicle ID information and the user ID information can be specified by using the other one.

The information terminal 300 carried by the user includes an external communication control section 301 serving as communication means that is a communication interface used for the connection to the network 400; a short-range communication control section 302 serving as communication means that is a communication interface for realizing short-range wireless communication, such as Bluetooth (registered trademark) or Wi-Fi (registered trademark); a GPS unit 303 that detects a current position of the information terminal 300 based on the radio waves from GPS satellites; a touch-panel-type liquid crystal display 304 which serves as a display device and an operating device; a primary control section 305 which is mainly composed of a microcomputer and is adapted to execute communication control and various application programs; and a nonvolatile memory 306 which stores various types of data such as application programs. Notably, for example, a cellular phone (e.g., a smartphone) or a tablet terminal having an external communication function can be employed as the information terminal 300. In the present embodiment, a compact information terminal that can be carried by the user is employed. However, a personal computer that is installed in his/her house and can be connected to the network 400 or a notebook computer that the user can carry and can be connected to the network 400 can also be employed as the information terminal 300.

The operation of the vehicle remote operation system thus configured according to the first embodiment, more specifically, the operations of the vehicle-mounted remote operation information acquisition device (specifically, the command acquisition ECU 110a), the vehicle remote operation information provision device (specifically, the server 210 in the command administration center 200), and the information terminal 300, will be described with reference to FIG. 2. In the vehicle remote operation system according to the first embodiment, the user who is an authorized owner of the vehicle 100 remotely operates the vehicle 100 via the command administration center 200 by using the information terminal 300.

Figure 2:
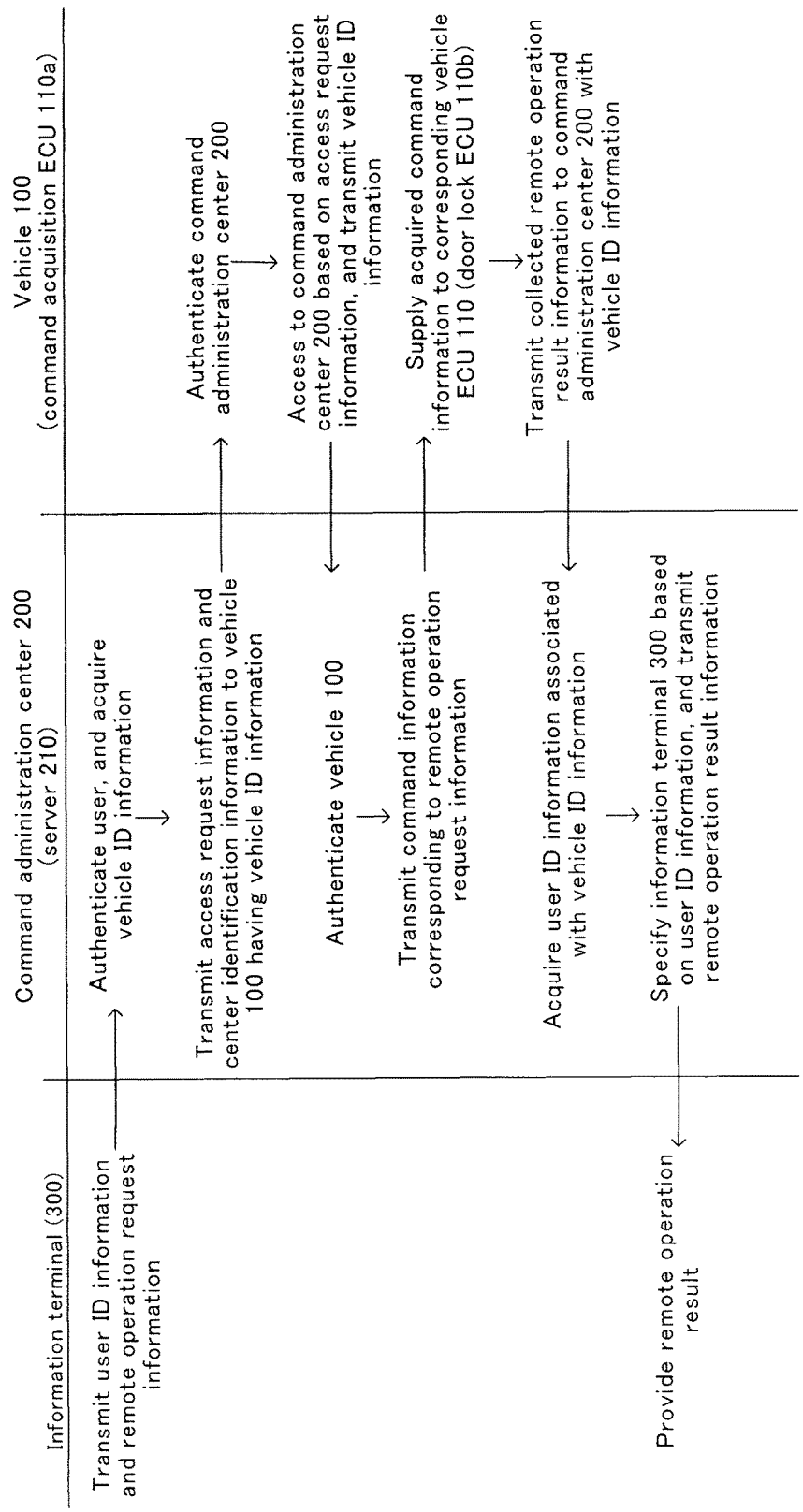
FIG. 2 is a flowchart for describing an operation flow for realizing a remote operation for the vehicle by the vehicle (command acquisition ECU) in FIG. 1, a command administration center (server), and an information terminal according to a first embodiment of the present invention.

Specifically, as illustrated in FIG. 2, the user firstly makes an access to the command administration center 200 connected to the network 400 by using the information terminal 300. In this case, the user inputs the user ID information that is given beforehand for identifying the user, and transmits the user ID information to the command administration center 200, by operating the touch-panel-type liquid crystal display 304 of the information terminal 300. The user also inputs and transmits remote operation request information, indicating the operation of the vehicle 100 (hereinafter referred to as "requested operation") requested (realized) by the remote operation, through the operation of the touch-panel-type liquid crystal display 304 of the information terminal 300. Examples of the requested operation include a request for operations of various devices mounted on the vehicle 100 (specifically, an air-conditioning unit, door lock unit, light unit, and other units) and a request for an operation of collecting the state of the vehicle 100 (specifically, failure information such as diagnostic information including operating states (charged state) of various devices, such as a battery, mounted on the vehicle 100).

In the command administration center 200, the server 210 receives (acquires) the user ID information and the remote operation request information, which are transmitted from the information terminal 300 via the network 400, by using the communication control section 211. The server 210 temporarily stores the acquired user ID information and the remote operation request information into a memory not illustrated. The user information server 214 in the server 210 searches the user ID information database 217 with the user ID information acquired from the information terminal 300, by utilizing the user ID information database 217, thereby specifying (authenticating) the user. The vehicle information server 213 in the server 210 searches the vehicle ID information database 216 by using the user ID information authenticated by the user information server 214 to extract the vehicle ID information associated with the user ID information, and supplies the extracted vehicle ID information to the command information server 212 in the server 210.

The command information server 212 transmits the access request information, which requests an access from the vehicle 100 to the command administration center 200 that is the predetermined connection destination, and center identification information (e.g., IP address) set beforehand for identifying the command administration center 200, to the vehicle 100 having the vehicle ID information acquired from the vehicle information server 213 by using this vehicle ID information. The transmission of the center identification information is not essential for the embodiment (operation) of the present invention, but this is effective for preventing unnecessary communication by the vehicle 100 (command acquisition ECU 110a).

When the command information server 212 transmits the access request information and the center identification information, the DCM 130 mounted on the vehicle 100 may not be started, so that the DCM 130 may not be capable of making communication. Therefore, the command information server 212 transmits start information via the network 400 by utilizing push-based communication that is an external trigger such as a sound signal or SMS (Short Message Service) to start the DCM 130, and then, transmits the access request information and the center identification information to the vehicle 100. When transmitting the access request information and the center identification information, the command information server 212 can also transmit type information indicating a type of the requested operation intended by the user (specifically, whether the requested information is an operation of each of various devices or a collecting operation of various information pieces, without including the remote operation command).

The primary control section 132 of the DCM 130 in the vehicle 100 acquires the access request information and the center identification information, which are transmitted through the external communication control section 131. The primary control section 132 supplies the access request information and the center identification information to the command acquisition ECU 110a via the CAN communication line 120. When acquiring the access request information and the center identification information, the command acquisition ECU 110a refers to the address information (IP address) stored beforehand in the nonvolatile memory in the command acquisition ECU 110a to determine whether or not the IP address indicated by the center identification information matches (or is included in) the address information stored beforehand, in order to authenticate the command administration center 200.

When authenticating that the command administration center 200 is the proper center, the command acquisition ECU 110a acquires the address information that is stored in the nonvolatile memory for an access to the command administration center 200 in accordance with the access request information, and outputs connection request information, which requests the connection to the address indicated by the address information, to the primary control section 132 in the DCM 130 via the CAN communication line 120 together with the address information. In this case, when the type information is transmitted from the command administration center 200, for example, the command acquisition ECU 110a can select the address information, corresponding to the type information, out of the plural address information pieces stored in the nonvolatile memory according to the type information acquired via the DCM 130, and output the selected information to the DCM 130.

When the primary control section 132 in the DCM 130 acquires the address information and the connection request information from the command acquisition ECU 110a, it accesses to the command administration center 200, which is the connection destination, via the network 400 according to these information pieces. In this case, the primary control section 132 in the DCM 130 also transmits the vehicle ID information (specifically, the MAC address or phone number) to the command administration center 200. Specifically, the primary control section 132 in the DCM 130 accesses to the command administration center 200 that is the connection destination indicated by the acquired address information, and transmits the vehicle ID information to the accessed command administration center 200.

In the command administration center 200, the communication control section 211 in the server 210 receives the vehicle ID information transmitted from the vehicle 100 via the network 400, and outputs this vehicle ID information to the vehicle information server 213. The vehicle information server 213 searches the vehicle ID information database by using the acquired vehicle ID information to authenticate whether or not the vehicle is the vehicle 100 transmitting the access request information. The user information server 214 acquires the user ID information associated with the vehicle ID information from the user ID information database 217 by using the vehicle ID information authenticated by the vehicle information server 213. The command information server 212 acquires the temporarily stored remote operation request information together with the user ID information acquired by the user information server 214, and acquires the command information corresponding to this remote operation request information by searching the command information database 215.

When acquiring the command information as described above, the command information server 212 transmits the acquired command information to the vehicle 100 (i.e., command acquisition ECU 110a) authenticated by the vehicle information server 213 via the network 400. Upon transmitting the command information, the command information server 212 can execute an encryption process to this command information with a known method (system), and then, transmit the encrypted command information. This process can assure further security.

In the vehicle 100, the command acquisition ECU 110a acquires the command information via the DCM 130. The command acquisition ECU 110a supplies the command information to the corresponding vehicle ECU 110 according to the acquired command information. In the case where the command information is encrypted by the command information server 212 in the command administration center 200, the command acquisition ECU 110a can acquire the command information after performing a decryption process to the command information with a known method (system).

If the operation indicated by the command information is a remote operation, specifically, a remote operation for allowing the door lock device to be locked or unlocked, the command acquisition ECU 110a supplies the command information to the door lock control ECU 110b. With this process, the door lock control ECU 110b unlocks the door lock device according to the remote operation, if the door lock device is in a locked state, and locks the door lock device according to the remote operation, if the door lock device is in an unlocked state, based on the supplied command information, for example. The door lock ECU 110b outputs the result of the remote operation for the door lock device (hereinafter referred to as a remote operation result) to the command acquisition ECU 110a via the CAN communication line 120.

The command acquisition ECU 110a collects the remote operation result information indicating the outputted remote operation result, transmits the collected remote operation result information to the DCM 130, and instructs the DCM 130 to transmit this information to the command administration center 200. In this case, the command acquisition ECU 110a can output the address information according to the type of the remote operation to the DCM 130 together with the remote operation result information. With this process, the DCM 130 transmits the remote operation result information to the command administration center 200 together with the vehicle ID information via the network 400.

In the command administration center 200, the user information server 214 in the server 210 extracts the user ID information, which is associated with the transmitted vehicle ID information, by using the user ID information database 217, and outputs the extracted user ID information to the command information server 212. The command information server 212 provides the remote operation result information transmitted from the vehicle 100 to the user of the vehicle 100 specified by the outputted (extracted) user ID information. Specifically, the command information server 212 specifies the information terminal 300 carried by the user of the vehicle 100 by using the user ID information outputted from the user information server 214, and transmits the remote operation result information to this information terminal 300 that is defined as a transmission destination. Thus, the user of the vehicle 100 can very easily recognize whether the vehicle 100 properly operates at present by the remote operation that the user demands (hopes). Specifically, the user can easily and surely recognize (confirm) whether the door lock device is changed from the locked state to the unlocked state, or changed from the unlocked state to the locked state, by the user's remote operation (i.e., command), by using the information terminal 300.

As understood from the above description, according to the vehicle remote operation system according to the first embodiment, when an authorized user remotely operates the vehicle 100, the system allows the vehicle 100 to access to (to be connected to) the command administration center 200, whereby the system can allow the vehicle 100 to acquire the command information. Thus, the vehicle remote operation system according to the first embodiment can surely prevent an occurrence of a situation in which a third person other than the authorized user remotely operates the vehicle 100, as stated in (a) to (d) below. This will be specifically described below.

Figure 3:
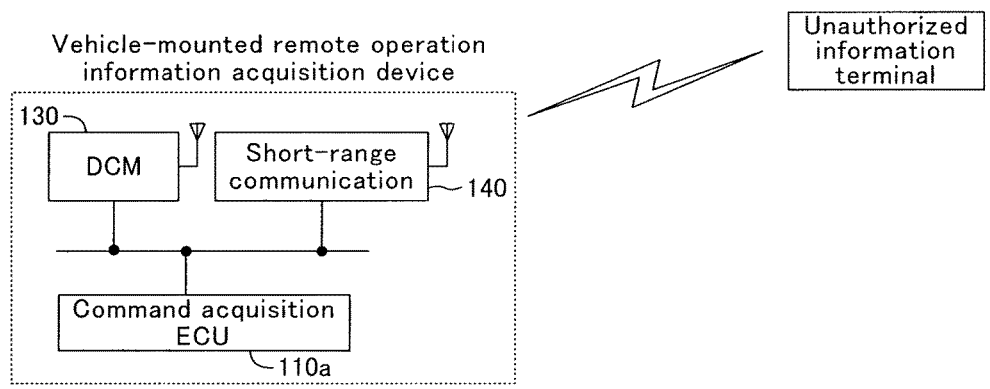
FIG. 3 is a diagram for describing that a remote operation not intended by the vehicle remote operation system according to the present invention can be prevented under a situation in which a vehicle can directly be operated by a remote operation by use of an unauthorized information terminal other than the information terminal carried by an authorized user illustrated in FIG. 1.

(a) Situation in which a Third Person Directly Makes a Remote Operation to the Vehicle 100 by Using an Information Terminal Other than the Information Terminal 300 Carried by the Authorized User Under this situation, an information terminal (hereinafter referred to as an unauthorized information terminal) carried by a third person other than the user of the vehicle 100 can make communication with the DCM 130 or the short-range communication control device 140 for any reason, and the third person can directly transmit command information for remotely operating the vehicle 100 via the unauthorized information terminal, as illustrated in FIG. 3. Under this situation, even if the third person transmits command information from the unauthorized information terminal to the vehicle 100 (more specifically, the command acquisition ECU 110a), for example, the command acquisition ECU 110a of the vehicle 100 does not acquire the transmitted command information.

Specifically, the command acquisition ECU 110a acquires command information by accessing to the command administration center 200, which is the predetermined (pre-specified) connection destination, based on the access request information transmitted from the command information server 212 in the command administration center 200 via the network 400, as described above. In other words, the command information is acquired such that the command acquisition ECU 110a temporarily accesses to the command administration center 200 via the network 400. Therefore, under the situation in which the command information is directly transmitted from the unauthorized information terminal as described above, the command acquisition ECU 110a does not acquire the command information, resulting in that the operation of the vehicle 100 by the remote operation intended by the third person (i.e., not intended by the authorized user) can surely be prevented.

(b) Situation in which a Third Person Transmits Command Information by Using a Network Other than the Network 400

Figure 4:
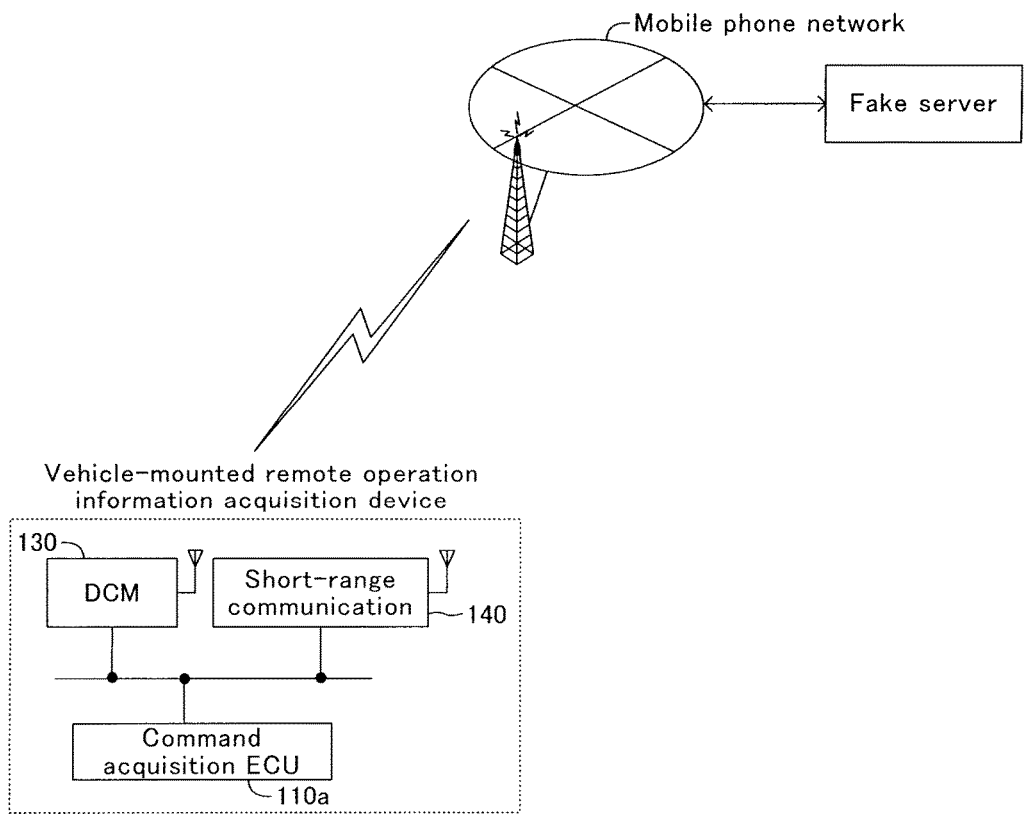
FIG. 4 is a diagram for describing that a remote operation not intended by the vehicle remote operation system according to the present invention can be prevented under a situation in which a vehicle can be operated by a fake server utilizing a network other than the network illustrated in FIG. 1.

Under this situation, a server (hereinafter referred to as a fake server) connected to a mobile phone network different from the network 400 can transmit access request information and command information to the vehicle 100 by using this mobile phone network, as illustrated in FIG. 4. Under this situation, when the third person other than the user of the vehicle 100 transmits access request information to the vehicle 100 via the mobile phone network by using the fake server, the command ECU 110a tries to access to the command administration center 200, which is the predetermined (pre-specified) connection destination, based on the transmitted access request information via the network 400. Therefore, the command acquisition ECU 110a does not have a chance to acquire the command information by accessing to the fake server.

Specifically, the command acquisition ECU 110a acquires command information by accessing to the command administration center 200, which is connected to the network 400 and which is the predetermined (pre-specified) connection destination, based on the acquired access request information, as described above. Therefore, even if the fake server transmits the access request information, the command acquisition ECU 110a accesses to the predetermined (pre-specified) command administration center 200. Accordingly, the command acquisition ECU 110a does not have a chance to acquire the command information by accessing to the fake server. Consequently, the operation of the vehicle 100 by the remote operation intended by the third person (i.e., not intended by the authorized user) can surely be prevented.

(c) Situation in which a Third Person Transmits Command Information by Using a Fake Server Pretending to be the Command Administration Center 200

Figure 5:
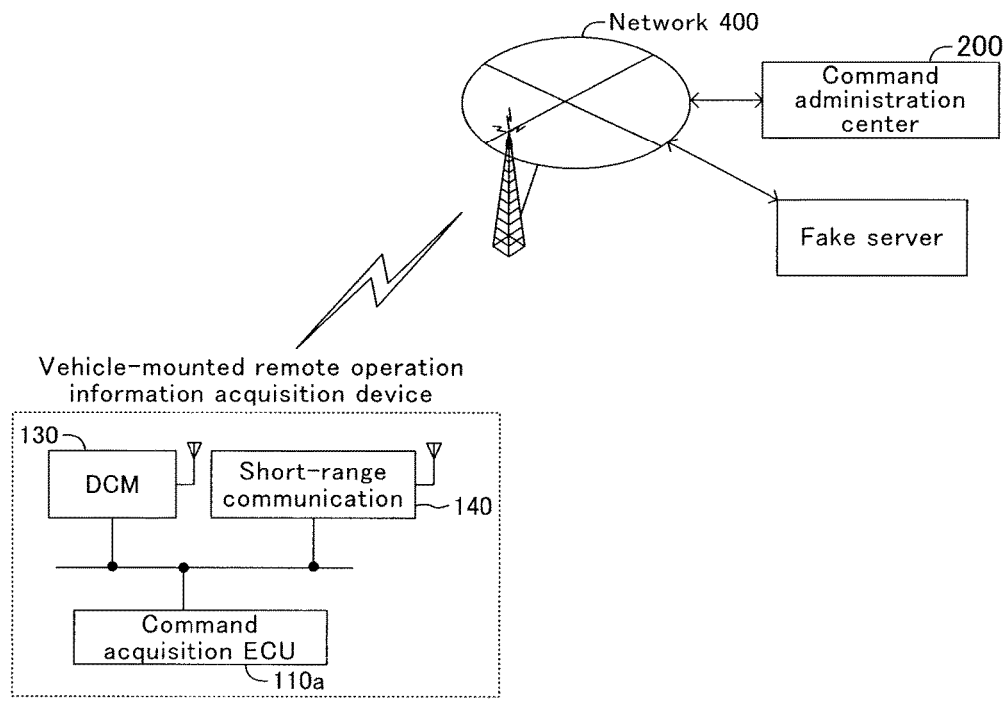
FIG. 5 is a diagram for describing that a remote operation not intended by the vehicle remote operation system according to the present invention can be prevented under a situation in which a vehicle can be operated by a remote operation by a fake server pretending to be the command administration center in FIG. 1.

Under this situation, a fake server connected to the network 400 as in the command administration center 200 pretends to be the server 210 in the command administration center 200, and can transmit command information to the vehicle 100 via the network 400, as illustrated in FIG. 5.

Under this situation, when a third person other than the user of the vehicle 100 transmits access request information to the vehicle 100 via the fake server, for example, the command acquisition ECU 110*a* tries to access to the command administration center 200, which is the predetermined (pre-specified) connection destination, based on the transmitted access request information. Therefore, the command acquisition ECU 110*a* does not have a chance to acquire the command information by accessing to the fake server.

Specifically, the command acquisition ECU 110*a* acquires command information by accessing to the command administration center 200, which is connected to the network 400 and which is the predetermined (pre-specified) connection destination, based on the acquired access request information, as described above. Therefore, even if access request information and command information are transmitted from the fake server connected to the network 400 as described above, the command acquisition ECU 110*a* accesses to the command administration center 200 that is the predetermined (pre-specified) connection destination, whereby the command acquisition ECU 110*a* does not have a chance to acquire the command information by accessing to the fake server. Consequently, the operation of the vehicle 100 by the remote operation intended by the third person (i.e., not intended by the authorized user) can surely be prevented.

(d) Situation in which Command Information is Transmitted by Use of an External Network that can be Connected to the Network 400

Figure 6:
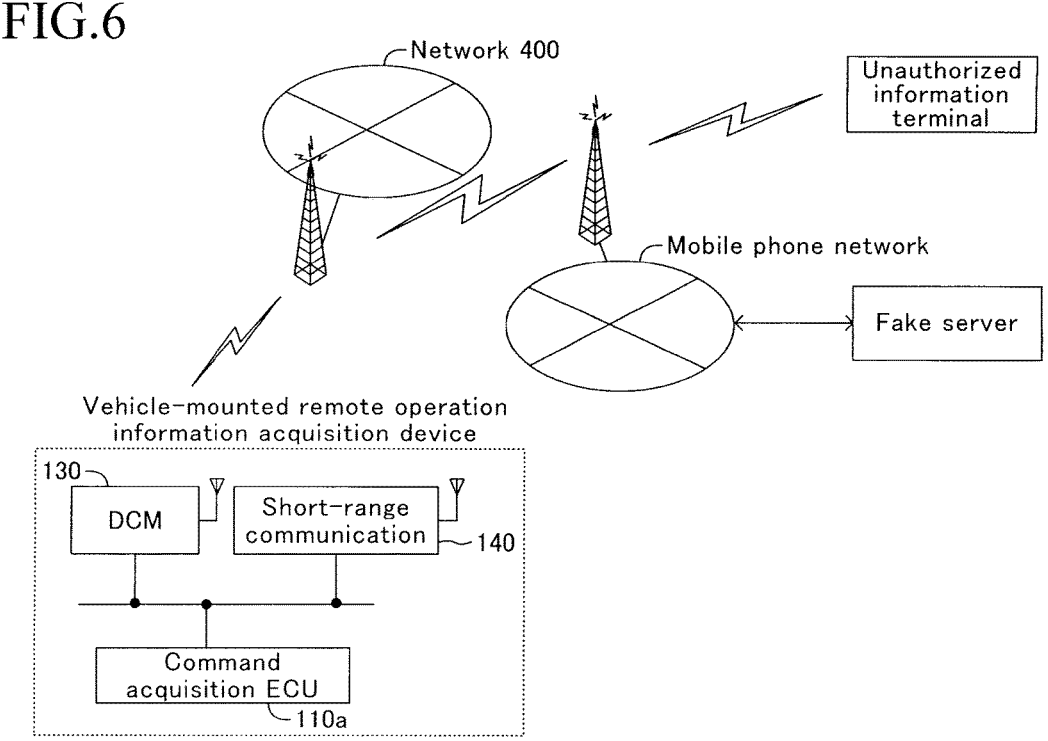
FIG. 6 is a diagram for describing that a remote operation not intended by the vehicle remote operation system according to the present invention can be prevented under a situation in which a vehicle can be operated by a fake server or an unauthorized information terminal utilizing an external network that can be connected to the network illustrated in FIG. 1.

Under this situation, a fake server or unauthorized information terminal connected to the external mobile phone network that can be connected to the network 400 can transmit command information to the vehicle 100 via the network 400 from this mobile phone network, as illustrated in FIG. 6. Under this situation, when a third person other than the user of the vehicle 100 transmits access request information to the vehicle 100 via the mobile phone network and the network 400 by using the fake server or the unauthorized information terminal, for example, the command ECU 110*a* tries to access to the command administration center 200, which is connected to the network 400 and which is the predetermined (pre-specified) connection destination, based on the transmitted access request information. Therefore, the command acquisition ECU 110*a* does not have a chance to acquire the command information by accessing to the fake server or the unauthorized information terminal connected to the external mobile phone network.

Specifically, the command acquisition ECU 110*a* acquires command information by accessing to the command administration center 200, which is connected to the network 400 and which is the predetermined (pre-specified) connection destination, based on the acquired access request information, as described above. Therefore, even if the fake server or the unauthorized information terminal connected to the external mobile phone network transmits the access request information via the network 400, the command acquisition ECU 110*a* accesses to the predetermined (pre-specified) command administration center 200. Accordingly, the command acquisition ECU 110*a* does not have a chance to acquire the command information by accessing to the fake server or the unauthorized information terminal connected to the external mobile phone network. Consequently, the operation of the vehicle 100 by the remote operation intended by the third person (i.e., not intended by the authorized user) can surely be prevented.

In the above first embodiment, the vehicle 100 acquires the access request information transmitted from the command administration center 200. The vehicle 100 then accesses to the command administration center 200, which is the connection destination, according to the access request information to acquire the command information. Thus, even if a communication system (specifically, a sound signal in push-based communication, or SMS) for the network 400 (mobile phone network) is different for each district, the vehicle 100 can surely access to the command administration center 200 by preparing start information or access request information according to each communication system. Accordingly, command information and remote operation result information can surely be transmitted and received in any district.

b. Modification of First Embodiment

In the above first embodiment, the authorized user accesses to the command administration center 200 by using the information terminal 300 to transmit the remote operation request information, the server 210 (command information server 212) in the command administration center 200 transmits the access request information to the command acquisition ECU 110*a* of the vehicle 100 via the network 400, and the command acquisition ECU 110*a* acquires command information from the command administration center 200 accessed by the command acquisition ECU 110*a*, via the network 400.

In this case, the command acquisition ECU 110*a* can access to the information terminal 300 carried by the authorized user, instead of the command administration center 200 as in the first embodiment, to acquire command information, as the predetermined (pre-specified) connection destination accessed by the command acquisition ECU 110*a* according to the access request information transmitted from the command administration center 200. Specifically, the information terminal 300 can function as the vehicle remote operation information provision device. Even if the command acquisition ECU 110*a* accesses to the predetermined (pre-specified) information terminal 300 as the connection destination according to the access request information, the occurrence of the situations (a) to (d) can surely be prevented. In the case where the command acquisition ECU 110*a* accesses to the information terminal 300 to acquire command information as described above, the command acquisition ECU 110*a* can access to the information terminal 300 via the DCM 130 and the network 400. Alternatively, the command acquisition ECU 110*a* can access to the information terminal 300 via the short-range communication control device 140. The modification of the first embodiment will specifically be described with reference to FIG. 7.

Figure 7:
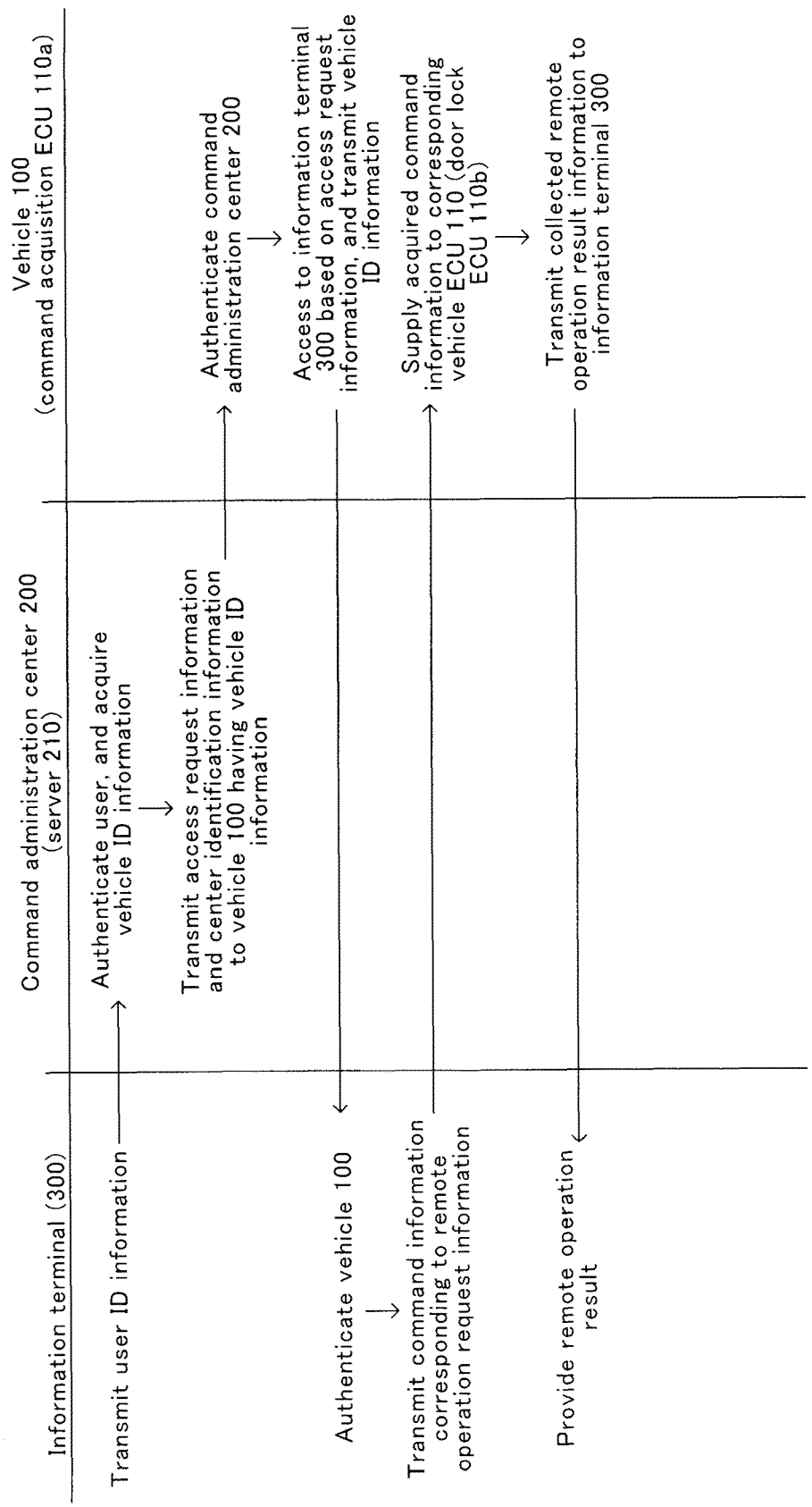
FIG. 7 is a flowchart for describing an operation flow for realizing a remote operation for the vehicle by the vehicle (command acquisition ECU) in FIG. 1, a command administration center (server), and an information terminal according to a modification of the first embodiment of the present invention.

In this modification, the user firstly inputs the remote operation request information and the user ID information by using the information terminal 300 as in the first embodiment, and the information terminal 300 accesses to the command administration center 200 to transmit only the user ID information, as illustrated in FIG. 7. With this process, the server 210 in the command administration center 200 transmits the access request information and center identification information to the command acquisition ECU 110*a* in the vehicle 100 via the network 400, as in the first embodiment. When acquiring the access request information and the center identification information, the command acquisition ECU 110*a* refers to the address information (IP address) stored in its nonvolatile memory to determine whether or not the IP address indicated by the center identification information matches (or is included in) the address information stored beforehand in order to authenticate the command administration center 200. When authenticating that the command administration center 200 is the proper center, the command acquisition ECU 110*a* acquires address information (IP address or phone number), which is stored in the nonvolatile memory for accessing to the information terminal 300 carried by the authorized user, according to the access request information, and outputs connection request information, which requests connection to the address indicated by the address information, to the primary control section 132 in the DCM 130 via the CAN communication line 120 together with the address information.

With this process, the DCM 130 is connected to the information terminal 300 carried by the authorized user via the network 400. The user can directly transmit the command information via the network 400, when the command acquisition ECU 110a in the vehicle 100 and the information terminal 300 are connected to each other to enable communication. Accordingly, the vehicle 100 can operate based on the remote operation intended by the authorized user.

On the other hand, the vehicle 100 (more specifically, the command acquisition ECU 110a) and the information terminal 300 (e.g., a portable smartphone or tablet terminal) carried by the authorized user can directly communicate with each other via the short-range communication control device 140 and the short-range communication control section 302, in other words, without using the network 400, as illustrated by a broken line in FIG. 1. When the vehicle 100 (command acquisition ECU 110a) and the information terminal 300 can directly communicate with each other as described above, the command acquisition ECU 110a can access to the information terminal 300, without using the network 400, according to the access request information from the administration center 200 to directly transmit the command information.

In the case where Bluetooth (registered trademark) is employed as the short-range wireless communication system between the vehicle 100 and the information terminal 300, for example, it is necessary that the authorized user of the vehicle 100 preliminarily executes a paring process between the vehicle 100 and the information terminal 300. According to the paring process between the vehicle 100 and the information terminal 300, the authorized user can use the information terminal 300 in a secure state, and transmit command information to the command acquisition ECU 110a of the vehicle 100. The paring process in Bluetooth (registered trademark) is not directly related to the present invention, so that it will only briefly be described below.

In the paring process, the user of the vehicle 100 operates, for example, the short-range communication control device 140 of the vehicle 100 to bring it into a searchable state in which it can search for his/her portable information terminal 300. On the other hand, the user of the vehicle 100 operates the portable information terminal 300 so as to bring its short-range communication control section 302 into the searchable state. Before the short-range communication control device 140 and the short-range communication control section 302 are set into the searchable state, their settings for authentication/encryption are rendered the same.

By means of bringing the respective devices in the searchable state as mentioned above, Bluetooth (registered trademark) devices existing nearby, i.e., the vehicle 100 (more specifically, the short-range communication control device 140) and the portable information terminal 300 (specifically, the short-range communication control section 302) are displayed on, for example, an unillustrated display mounted on the vehicle 100 and the touch-panel-type liquid-crystal display 304 of the portable information terminal 300. The user designates the vehicle 100 as a counterpart device of the portable information terminal 300, and designates the portable information terminal 300 as a counterpart device of the vehicle 100. After selecting the vehicle 100 and the portable information terminal 300 as the counterpart devices, the user enters the same passkey (authentication key (PIN)). The short-range communication control device 140 and the short-range communication control section 302 exchange the entered passkey with each other, whereby the pairing process is completed.

Once the paring process for taking advantage of Bluetooth (registered trademark) communications is completed between the vehicle 100 and the portable information terminal 300 as mentioned above, connection for the communication can be established when the user carrying the portable information terminal 300 is around the vehicle 100. Notably, when the connection is established, the establishment of the connection is reported to the user via the display in the compartment or the touch-panel-type liquid crystal display 304 in the information terminal 300.

As described above, when the user accesses to the command administration center 200 to transmit only the user ID information in the state in which the paring process is executed beforehand, the server 210 in the command administration center 200 transmits the access request information and the center identification information to the command acquisition ECU 110a in the vehicle 100 via the network 400. With this process, the command acquisition ECU 110a authenticates the command administration center 200 by using the address information (IP address) and the center identification information (IP address), which are stored in its nonvolatile memory beforehand.

After authenticating that the command administration center 200 is the proper center, the command acquisition ECU 110a outputs connection request information, requesting the establishment of the connection with the paired information terminal 300 according to the access request information, to the short-range communication control device 140 via the CAN communication line 120.

With this process, the short-range communication control device 140 establishes connection with the short-range communication control section 302 in the information terminal 300 that is carried by the authorized user and located around the vehicle 100. Therefore, the user can directly transmit the command information to the command acquisition ECU 110a of the vehicle 100 by using the information terminal 300, without using the network 400. Thus, the vehicle 100 can operate by the remote operation intended by the authorized user.

As understood from the above description, the vehicle 100 can be connected to the information terminal 300, which is the predetermined (pre-specified) connection destination, and acquire the command information even in this modification, as in the above first embodiment. Accordingly, in this modification, the occurrence of the situations (a) to (d) can surely be prevented.

c. Second Embodiment

In the above first embodiment and the modification, the access request information is temporarily transmitted to the vehicle 100 from the command administration center 200 connected to the network 400. With this process, the command acquisition ECU 110a in the vehicle 100 accesses to the predetermined (pre-specified) connection destination (specifically, the command administration center 200 or the information terminal 300 carried by the authorized user), based on the access request information, and can acquire the command information.

A wireless communication using radio waves, such as an ad hoc mode (ad hoc communication) in the paired Bluetooth (registered trademark) communication or Wi-Fi (registered trademark) communication, or a wireless communication using light ray such as infrared ray or sound wave is employed between the short-range communication control device 140 in the vehicle 100 and the short-range communication control section 302 in the information terminal 300, whereby secure communication is possible with mutual authentication being established. Accordingly, when the wireless communication system that enables the mutual authentication is employed, the direct communication connection can be established between the vehicle 100 and the information terminal 300 without using the command administration center 200 connected to the network 400. The second embodiment will be specifically described below. The portions same as those in the first embodiment are identified by the same numerals, and their detailed description will not be repeated.

Figure 8:
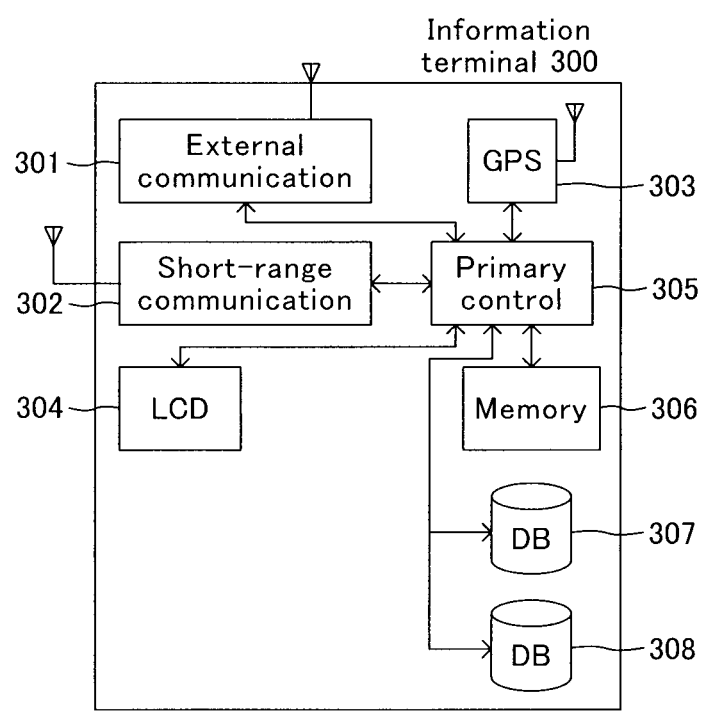
FIG. 8 is a block diagram schematically illustrating a configuration of an information terminal according to a second embodiment of the present invention.

In the second embodiment, the vehicle 100 directly interacts with the information terminal 300. Therefore, the command administration center 200 and the network 400 in the first embodiment are eliminated. As illustrated in FIG. 8, the information terminal 300 in the second embodiment includes a command information database 215 that stores command information pieces in such a manner that these information pieces can be searched, as in the command information database 307 in the above first embodiment. The information terminal 300 in the second embodiment includes a vehicle ID information database 308 that stores vehicle ID information pieces (e.g., information corresponding to the registration number or chassis number of the vehicle, or a MAC address or phone number of the short-range communication control section 302) for specifying the vehicle 100 in such a manner that these information pieces can be searched, as in the vehicle ID information database 216 in the above first embodiment.

Figure 9:
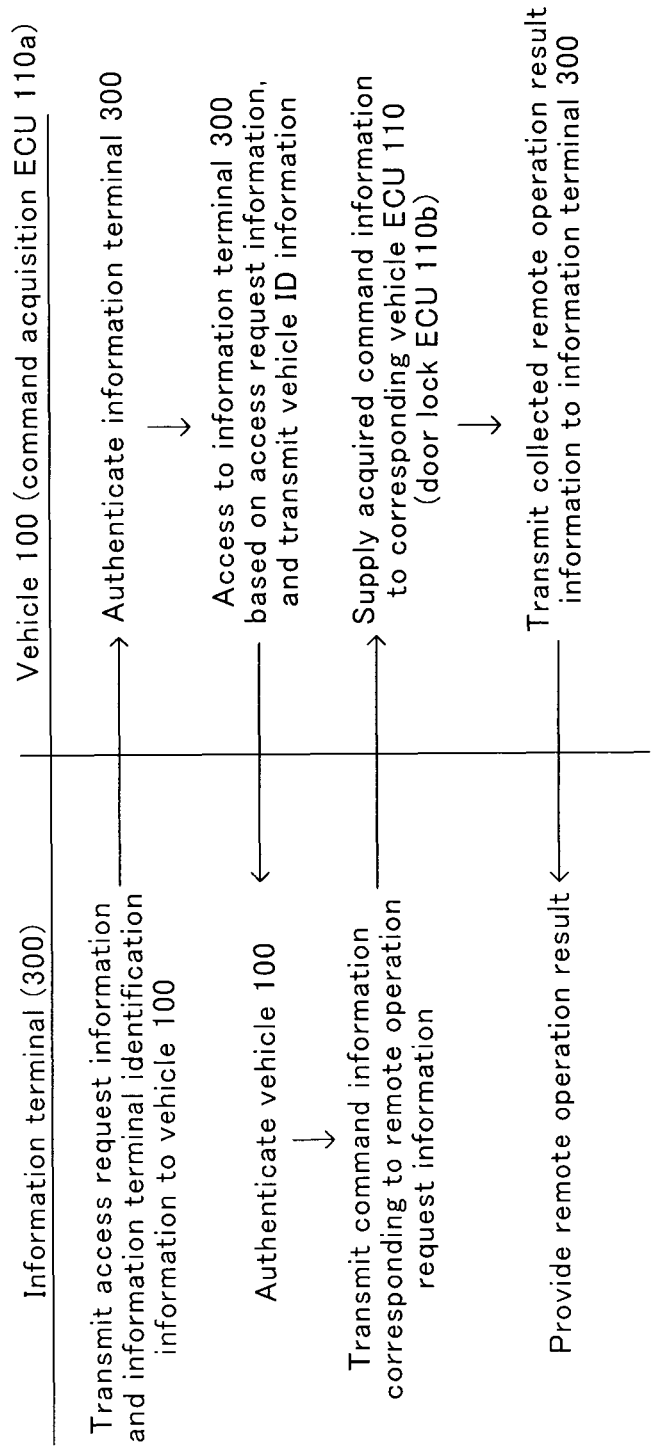
FIG. 9 is a flowchart for describing an operation flow for realizing a remote operation for the vehicle by the vehicle (command acquisition ECU) in FIG. 1 and an information terminal according to the second embodiment of the present invention.

In the vehicle remote operation system thus configured and including the information terminal 300 according to the second embodiment, ad hoc mode in Bluetooth (registered trademark) communication or Wi-Fi (registered trademark) communication is employed between the paired devices, and the user who is the authorized owner of the vehicle 100 directly operates the vehicle 100 by the remote operation by using the information terminal 300. For this, the user firstly inputs remote operation request information, requesting a remote operation for the vehicle 100, by operating the touch-panel-type liquid crystal display 304 in the information terminal 300 as illustrated in FIG. 9. With this, the primary control section 305 in the information terminal 300 transmits access request information, requesting an access to the information terminal 300, and information terminal identification information (e.g., MAC address) that is set beforehand for identifying the information terminal 300, to the vehicle 100.

When the information terminal 300 transmits the access request information and the information terminal identification information, the short-range communication control device 140 mounted on the vehicle 100 may not be started, so that the wireless communication might be impossible. Therefore, the command acquisition ECU 110a may start the short-range communication control device 140 at predetermined time intervals by using an internal timer not illustrated, for example. Alternatively, upon transmitting the access request information and the information terminal identification information, the information terminal 300 may issue, to a center (base station) connected to the mobile phone network to which the DCM 130 of the vehicle 100 is connected, a request to transmit start information for starting the short-range communication control device 140 to the vehicle 100 as an external trigger utilizing push-based communication.

In the vehicle 100, the short-range communication control device 140 is started, and receives the access request information and the information terminal identification information. The short-range communication control device 140 supplies the access request information and the information terminal identification information to the command acquisition ECU 110a via the CAN communication line 120. When acquiring the access request information and the information terminal identification information, the command acquisition ECU 110a determines whether or not the MAC address indicated by the information terminal identification information matches (or is included in) connection device information (MAC address), which is stored beforehand in the nonvolatile memory of the command acquisition ECU 110a, by referring to the connection device information in order to authenticate the information terminal 300. After authenticating that the information terminal 300 is the proper counterpart device (connection device), the command acquisition ECU 110a acquires the connection device information of the information terminal 300 according to the access request information, and outputs the connection request information to the short-range communication control device 140 via the CAN communication line 120 together with the connection device information.

When acquiring the connection device information and the connection request information from the command acquisition ECU 110a, the short-range communication control device 140 transmits vehicle ID information (e.g., information corresponding to the registration number or chassis number of the vehicle) to the information terminal 300 with Bluetooth (registered trademark) communication or Wi-Fi (registered trademark) communication according to each of these information pieces. Specifically, the short-range communication control device 140 transmits the vehicle ID information to the information terminal 300 that is the predetermined (pre-specified) connection destination by the acquired connection device information (MAC address).

The information terminal 300 receives the vehicle ID information, transmitted form the vehicle 100, by using the short-range communication control section 302. The primary control section 305 searches the vehicle ID information database 308 by using this vehicle ID information, and authenticates whether or not the vehicle is the vehicle 100 transmitting the access request information. Then, the primary control section 305 searches the command information database 307 to acquire the command information corresponding to the remote operation request information inputted by the user.

After acquiring the command information as described above, the primary control section 305 transmits the acquired command information to the vehicle 100, which is authenticated as described above, through Bluetooth (registered trademark) communication or Wi-Fi (registered trademark) communication. In the second embodiment, the primary control section 305 can encrypt the command information with a known method (system), and transmit the encrypted command information, upon transmitting the command information.

In the vehicle 100, the command acquisition ECU 110a acquires the command information via the short-range communication control device 140. The command acquisition ECU 110a supplies the command information to the corresponding vehicle ECU 110 based on the acquired command information. In the second embodiment, the command acquisition ECU 110a can decrypt the encrypted command information. In the second embodiment, if the remote operation requested by the user is for bringing the door lock device into a locked state or unlocked state, the command acquisition ECU 110a supplies the command information to the door lock control ECU 110b. With this, the door lock ECU 110b allows the door lock device to be in the unlocked state according to the remote operation, if the door lock device is in the locked state, while the door lock ECU 110b allows the door lock device to be in the locked state according to the remote operation, if the door lock device is in the unlocked state. The door lock ECU 110b outputs the result of the remote operation to the command acquisition ECU 110a via the CAN communication line 120.

The command acquisition ECU 110a collects remote operation result information, indicating the outputted remote operation result. The command acquisition ECU 110a supplies the collected information to the short-range communication control device 140, and instructs the short-range communication control device 140 to transmit this information to the information terminal 300. According to this, the short-range communication control device 140 transmits the remote operation result information to the information terminal 300 through Bluetooth (registered trademark) communication or Wi-Fi (registered trademark) communication.

Thus, the user of the vehicle 100 can very easily recognize whether or not the vehicle 100 properly operates at present by the remote operation that the user demands (hopes). Specifically, the user can easily and surely recognize (confirm) whether the door lock device is changed from the locked state to the unlocked state, or changed from the unlocked state to the locked state, by the user's remote operation (i.e., command), by using the information terminal 300.

As understood from the above description, according to the vehicle remote operation system according to the second embodiment, the command acquisition ECU 110a in the vehicle 100 can be connected to the information terminal 300, which is the predetermined (pre-specified) connection destination based on the access request information, to acquire the command information. Thus, the vehicle remote operation system according to the second embodiment can also surely prevent the occurrence of the situations (a) to (d) described above.

Upon embodying the present invention, the present invention is not limited to the above-described embodiments and modifications, and various changes are possible without departing from the scope of the present invention.

For example, in the embodiments and the modification described above, the vehicle 100 (more specifically, the command acquisition ECU 110a) and the command administration center 200 (specifically, the server 210), or the vehicle 100 (more specifically, the command acquisition ECU 110a) and the information terminal 300 (more specifically, the primary control section 305) mutually authenticate by using any one of character string information (text information) of the vehicle ID information, the center identification information, and the information terminal identification information. In this case, it is obvious that the vehicle 100 (more specifically, the command acquisition ECU 110a) and the command administration center 200 (specifically, the server 210), or the vehicle 100 (more specifically, the command acquisition ECU 110a) and the information terminal 300 (more specifically, the primary control section 305) can mutually authenticate by using a so-called electronic certificate. In this case, stronger mutual authentication can be realized.

In the embodiments and the modification described above, the command acquisition ECU 110a, the DCM 130, and the short-range communication control device 140 in the vehicle 100 are separately provided. However, it is obvious that the command acquisition ECU 110a, the DCM 130, and the short-range communication control device 140 can be integrally provided. The effect similar to the above embodiments and the modification can be obtained, even if the command acquisition ECU 110a, the DCM 130, and the short-range communication control device 140 can be integrally provided.

In the second embodiment, the information terminal 300 directly provides command information to the vehicle 100. In this case, it is also possible that access information is directly transmitted to the command acquisition ECU 110a from the information terminal 300, and the vehicle 100 accesses to the command administration center 200 via the network 400, configured similar to the first embodiment, based on the access information to acquire the command information, for example. Even in this case, the vehicle 100 can be connected to the command administration center 200, which is the predetermined (pre-specified) connection destination, to acquire the command information, as in the above first embodiment. Therefore, the occurrence of the above situations (a) to (d) can surely be prevented even in this case.

In the second embodiment, the information terminal 300 directly acquires remote operation result information from the short-range communication control device 140 of the vehicle 100. In this case, the remote operation result information can be outputted from the DCM 130 in the vehicle 100, and the information terminal 300 can receive the remote operation result information, outputted from the DCM 130, via the mobile phone network and the center (base station). With this configuration, the remote operation result information can be acquired, even if the information terminal 300 is not around the vehicle 100, whereby the user can always recognize the remote operation state of the vehicle 100.

The invention claimed is:
1. A vehicle remote operation information provision device that provides various information pieces relating to a remote operation for a vehicle requested by a user of the vehicle, the device comprising:
   a communication interface that realizes indirect communication with the vehicle through a predetermined network or direct communication with the vehicle, and
   at least one processor configured to:
   acquire remote operation request information indicating a request of a remote operation for the vehicle by the user of the vehicle;
   transmit access request information to the vehicle based on the acquired remote operation request information, the access request information including information for use by the vehicle to access a connection destination for prompting provision, to the vehicle, of command information indicating a remote operation command for realizing the remote operation requested by the user of the vehicle;
   provide the command information to the vehicle according to the access from the vehicle;
   transmit the access request information to the vehicle by using the indirect communication by the communication interface; and transmit the command information to the vehicle by using the direct communication by the communication interface.

2. The vehicle remote operation information provision device according to claim 1, wherein the connection destination is:
a command administration center that is connected to a predetermined network to which the vehicle is connected, and that provides the command information by communication through the predetermined network, or
an information terminal that is carried by the user of the vehicle, and that provides the command information by either one of the indirect communication with the vehicle through the predetermined network and the direct communication with the vehicle.

3. The vehicle remote operation information provision device according to claim 1, wherein the at least one processor is further configured to:
provide the command information after encrypting the command information with an encryption process.

4. The vehicle remote operation information provision device according to claim 1, wherein the direct communication includes communication without using the predetermined network.

5. The vehicle remote operation information provision device according to claim 4, wherein the direct communication includes a short-range communication protocol.

6. The vehicle remote operation information provision device according to claim 5, wherein the short-range communication protocol includes BLUETOOTH.

7. The vehicle remote operation information provision device according to claim 4, wherein the direct communication includes a paired communication protocol.

8. The vehicle remote operation information provision device according to claim 1, wherein the direct communication includes a short-range communication protocol.

9. The vehicle remote operation information provision device according to claim 8, wherein the short-range communication protocol includes BLUETOOTH.

10. The vehicle remote operation information provision device according to claim 1, wherein the direct communication includes a paired communication protocol.

11. The vehicle remote operation information provision device according to claim 10, wherein the paired communication protocol includes BLUETOOTH.

12. The vehicle remote operation information provision device according to claim 1, wherein the direct communication includes communication without any intermediary device.

13. The vehicle remote operation information provision device according to claim 1, wherein the direct communication and the indirect communication are different means of communication.

14. A vehicle-mounted remote operation information acquisition device that is mounted on a vehicle for acquiring various information pieces, relating to a remote operation for the vehicle requested by a user of the vehicle, from an outside, the device comprising:
a communication interface that realizes indirect communication with the outside through a predetermined network or direct communication with the outside, and
an ECU configured to:
acquire access request information that is transmitted from the outside, the access request information including information for use by the vehicle-mounted remote operation information acquisition device to access a connection destination for prompting provision, to the vehicle-mounted remote operation information acquisition device, of command information indicating a remote operation command for realizing the remote operation requested by the user of the vehicle;
access the connection destination based on the acquired access request information to acquire the command information from the connection destination;
acquire the access request information from the outside by using the indirect communication by the communication interface; and
acquire the command information from the connection destination by using the direct communication by the communication interface.

15. The vehicle-mounted remote operation information acquisition device according to claim 14, wherein the connection destination is:
a command administration center that is connected to a predetermined network to which the vehicle is connected, and that provides the command information by communication through the predetermined network, or
an information terminal that is carried by a user of the vehicle, and that provides the command information by either one of the communication through the predetermined network and the direct communication with the vehicle.

16. The vehicle-mounted remote operation information acquisition device according to claim 14, wherein the ECU is further configured to:
acquire the command information by decrypting the command information, which is encrypted at the connection destination, with a decryption process.

17. A vehicle remote operation system, comprising:
a vehicle remote operation information provision device that provides various information pieces relating to a remote operation for a vehicle requested by a user of the vehicle; and
a vehicle-mounted remote operation information acquisition device that is mounted on the vehicle for acquiring the various information pieces from the vehicle remote operation information provision device, wherein
the vehicle remote operation information provision device includes at least one processor configured to:
acquire remote operation request information indicating a request of a remote operation for the vehicle by the user of the vehicle;
transmit access request information to the vehicle-mounted remote operation information acquisition device based on the acquired remote operation request information, the access request information including information for use by the vehicle-mounted remote operation information acquisition device to access a connection destination for prompting provision, to the vehicle-mounted remote operation information acquisition device, of command information indicating a remote operation command for realizing the remote operation requested by the user of the vehicle; and
provide the command information to the vehicle-mounted remote operation information acquisition device according to the access from the vehicle-mounted remote operation information acquisition device,
the vehicle-mounted remote operation information acquisition device includes an ECU configured to:
acquire the transmitted access request information; and access the connection destination based on the acquired access request information to acquire the command information from the connection destination, the vehicle remote operation information provision device and the vehicle-mounted remote operation information acquisition device each include a communication interface that realize indirect communication with each other through a predetermined network or direct communication with each other, the at least one processor and the ECU transmit and receive the access request information by using the indirect communication by the communication interface, and the at least one processor and the ECU transmit and receive the command information by using the direct communication by the communication interface.

18. The vehicle remote operation system according to claim 17, wherein the connection destination is:

a command administration center that is connected to a predetermined network to which at least the vehicle-mounted remote operation information acquisition device is connected, and that provides the command information by communication through the predetermined network, or an information terminal that is carried by a user of the vehicle, and that provides the command information by either one of the communication through the predetermined network and the direct communication with the vehicle-mounted remote operation information acquisition device.

19. The vehicle remote operation system according to claim 17, wherein the at least one processor is configured to provide the command information after encrypting the command information with an encrypting process, and the ECU is configured to acquire the command information by decrypting the encrypted command information with a decryption process.

20. The vehicle remote operation system according to claim 17, wherein the at least one processor is further configured to authenticate the vehicle, to which the vehicle-mounted remote operation information acquisition device is mounted, with the access to the connection destination, and the ECU is further configured to authenticate the vehicle remote operation information provision device with the acquisition of the transmitted access request information.

* * * * *